(12) United States Patent
Kim et al.

(10) Patent No.: US 11,063,316 B2
(45) Date of Patent: Jul. 13, 2021

(54) BATTERY MODULE INCLUDING CROSS BEAM AND BATTERY PACK COMPRISING THE SAME

(71) Applicant: LG CHEM, LTD., Seoul (KR)

(72) Inventors: Hyung-Kyu Kim, Daejeon (KR); Tae-Wook Kim, Daejeon (KR); Myung-Ki Park, Daejeon (KR)

(73) Assignee: LG Chem, Ltd., Seoul (KR)

(*) Notice: Subject to any disclaimer, the term of this patent is extended or adjusted under 35 U.S.C. 154(b) by 189 days.

(21) Appl. No.: 16/213,205

(22) Filed: Dec. 7, 2018

(65) Prior Publication Data
US 2019/0181405 A1 Jun. 13, 2019

(30) Foreign Application Priority Data

Dec. 12, 2017 (KR) .................. 10-2017-0170200

(51) Int. Cl.
| | |
|---|---|
| *H01M 2/16* | (2006.01) |
| *H01M 50/20* | (2021.01) |
| *H01M 10/6556* | (2014.01) |
| *H01M 10/613* | (2014.01) |
| *H01M 10/625* | (2014.01) |
| *H01M 10/6567* | (2014.01) |

(52) U.S. Cl.
CPC ......... *H01M 50/20* (2021.01); *H01M 10/613* (2015.04); *H01M 10/625* (2015.04); *H01M 10/6556* (2015.04); *H01M 10/6567* (2015.04)

(58) Field of Classification Search
CPC ........................... H01M 2/1077; H01M 10/613
See application file for complete search history.

(56) References Cited

U.S. PATENT DOCUMENTS

| | | | |
|---|---|---|---|
| 8,293,397 B2 * | 10/2012 | Uchida | H01M 2/1077 429/120 |
| 8,967,312 B2 | 3/2015 | Yanagi | |
| 8,999,544 B2 | 4/2015 | Bender et al. | |
| 9,166,260 B2 * | 10/2015 | Kim | H01M 2/12 |

(Continued)

FOREIGN PATENT DOCUMENTS

| | | |
|---|---|---|
| JP | H07-52659 A | 2/1995 |
| JP | 2012-18797 A | 1/2012 |

(Continued)

OTHER PUBLICATIONS

Office Action dated Jan. 25, 2021, issued in corresponding Korean Patent Application No. 10-2017-0170200.

*Primary Examiner* — Amanda C. Walke (74) *Attorney, Agent, or Firm* — Morgan, Lewis & Bockius LLP (57) ABSTRACT

A battery module and a battery pack are disclosed. The battery module includes a module frame having a top plate and a bottom plate vertically spaced apart from each other at a predetermined interval and disposed to face each other, and at least one barrier configured to vertically partition a space between the top and bottom plates; two or more battery submodules arranged inside the module frame in a matrix form with the at least one barrier being interposed therebetween; and a left side plate and a right side plate configured to cover a left side and a right side of the module frame and a front cover and a rear cover configured to cover a front side and a rear side of the module frame.

11 Claims, 6 Drawing Sheets

(56) References Cited

U.S. PATENT DOCUMENTS

| | | | |
|---|---|---|---|
| 9,254,609 B2 | 2/2016 | Choi et al. | |
| 10,840,566 B2 * | 11/2020 | Soki | H01M 10/482 |
| 2014/0182958 A1 | 7/2014 | Rawlinson et al. | |
| 2016/0013526 A1 | 1/2016 | Uchiyama et al. | |
| 2017/0012330 A1 * | 1/2017 | Kim | H01M 2/1077 |
| 2017/0365887 A1 * | 12/2017 | Kwon | H01M 10/6556 |
| 2018/0151925 A1 * | 5/2018 | Yoshida | H01M 10/651 |
| 2018/0190955 A1 | 7/2018 | Motohashi et al. | |
| 2019/0267682 A1 * | 8/2019 | Seo | H01M 2/1016 |
| 2020/0067156 A1 * | 2/2020 | Chi | H01M 10/6551 |
| 2020/0203784 A1 * | 6/2020 | Shimizu | H01M 10/613 |
| 2020/0212385 A1 * | 7/2020 | Shi | H01M 2/347 |
| 2020/0295415 A1 * | 9/2020 | Honda | H01M 10/653 |

FOREIGN PATENT DOCUMENTS

| | | |
|---|---|---|
| JP | 2012-169276 A | 9/2012 |
| JP | 5756530 B2 | 7/2015 |
| JP | 6020958 B2 | 10/2016 |
| JP | 2017-010778 A | 1/2017 |
| JP | 2017-24481 A | 2/2017 |
| JP | 6123746 B2 | 5/2017 |
| JP | 2017-111893 A | 6/2017 |
| JP | 6208050 B2 | 9/2017 |
| KR | 10-2013-107823 A | 10/2013 |

* cited by examiner

BATTERY MODULE INCLUDING CROSS BEAM AND BATTERY PACK COMPRISING THE SAME

TECHNICAL FIELD

The present application claims priority to Korean Patent Application No. 10-2017-0170200 filed on Dec. 12, 2017 in the Republic of Korea, the disclosures of which are incorporated herein by reference.

The present disclosure relates to a battery module and a battery pack comprising the same, and more particularly, to a battery module capable of functions as a cross beam of a conventional battery pack tray and a battery pack comprising such battery modules.

BACKGROUND ART

Unlike a primary battery which is not rechargeable, a secondary battery refers to a battery capable of charging and discharging and is used as a power source for an energy storage system (ESS), an electric vehicle (EV) or a hybrid electric vehicle (HEV) as well as small advanced electronic devices such as a mobile phone, a PDA and a notebook computer.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

For example, when a plurality of battery cells are connected in series or in parallel to configure a battery pack, it is common to configure a battery module composed of a plurality of battery cells first, and then configure a battery pack by using a plurality of battery modules and adding other components. In other words, the battery module refers to a component where a plurality of secondary batteries are connected in series or in parallel, and the battery pack refers a component where a plurality of battery modules are connected in series or in parallel to increase capacity and output.

Meanwhile, the battery pack applied to an electric vehicle is demanded to have durability against external impacts and vibrations since it is placed in an environment in which impacts and vibrations are repeatedly applied.

In this regard, a cross beam is recently used to reinforce the rigidity of the pack tray. The cross beam is a beam-shaped structure installed across the pack tray and supports a side surface of the pack tray to prevent deformation such as twisting or bending of the pack tray during external impact or vibration.

However, if the cross beam is installed at the pack tray, even though the durability of the battery pack is improved, the space for mounting the battery modules is reduced as much. Since a large-capacity battery pack is installed in a limited space of the electric vehicle, it is required to have a high energy density as well as the structural stability of the battery pack. From this point of view, the cross beam of the conventional battery pack has a negative factor in terms of space utilization even though it is good for reinforcing the mechanical rigidity of the pack tray. Thus, the study on a new type of battery module and battery pack capable of satisfying both the structural stability and high energy density of the battery pack has become an issue.

RELATED LITERATURES

Patent Literature

Korean Unexamined Patent Publication No. 10-2013-0107823 (Oct. 2, 2013), Hyundai Motor Company

DISCLOSURE

Technical Problem

The present disclosure is designed to solve the problems of the related art, and therefore the present disclosure is directed to providing a battery pack having improved structural stability and improved energy density by using a battery module in which a cross beam is eliminated from a conventional battery pack tray but a function of the cross beam is included.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a module frame having a top plate and a bottom plate vertically spaced apart from each other at a predetermined interval and disposed to face each other, and at least one barrier configured to vertically partition a space between the top and bottom plates; two or more battery submodules arranged inside the module frame in a matrix form with the at least one barrier being interposed therebetween; and a left side plate and a right side plate configured to cover a left side and a right side of the module frame and a front cover and a rear cover configured to cover a front side and a rear side of the module frame.

The battery module may further comprise a module/tray connection member having one side coupled to the at least one barrier and the other side exposed to the outside through the front cover and the rear cover.

The module/tray connection member may include a body with a predetermined thickness, a plurality of first connection rods protruding on the body in multi stages, and a second connection rod protruding on the body in a direction opposite to the first connection rods, and the plurality of first connection rods may be fit into accommodation holes formed at a front end and a rear end of the barrier by tapping, and the second connection rod may be exposed to the outside through the front cover and the rear cover.

Also, the module/tray connection member may further include a flange portion extending from the body in the vertical direction, and the flange portion is screwed to the barrier.

The top and bottom plates may have coupling holes formed through edge regions thereof in the vertical direction, and the left and right side plates may have protrusions protruding from surfaces thereof, and coupling grooves may be provided at the protrusions so as to be screwed to the coupling holes in the vertical direction.

Each of the battery submodules may include a cell stack having battery cells stacked on one another and an end plate having three surfaces surrounding front and rear surfaces and one side surface of the cell stack, and the other side surface of the cell stack may be disposed to face the barrier of the module frame.

The battery module may further comprise a partition block interposed between rows of the two or more battery submodule inside the module frame to partition the battery submodules along with the barrier.

The module/tray connection member according to another embodiment may have a passage formed therein to serve as a pipe, and the accommodation holes may form a flow path connecting from a front end of the barrier to a rear end thereof.

In another aspect of the present disclosure, there is also provided a battery pack, comprising: battery modules as described above; and a pack tray having a plate surface formed with a width corresponding to a length of the battery modules, wherein the battery modules are arranged at the plate surface of the pack tray in a traverse direction to support left and right walls of the pack tray.

The battery modules may be fixed to the pack tray by means of a shoulder bolt that has one end passing through the barrier in the vertical direction and is coupled to the plate surface of the pack tray.

Also, each of the battery modules may further include a module/tray connection member having one side coupled to the barrier and the other side exposed to the outside through the front cover and the rear cover, and the other side of the module/tray connection member may be inserted into a perforation hole formed in the left and right walls of the pack tray.

The module/tray connection member may have a passage therein to serve as a pipe, the barrier may have a flow path connected to one side of the module/tray connection member, and the battery pack may further comprise a coolant supplying/discharging hose connected to the other side of the module/tray connection member at an outer side of the perforation hole of the left and right walls of the pack tray.

Advantageous Effects

According to an embodiment of the present disclosure, it is possible to provide a unit battery module capable of giving both a cross tray function of the pack tray and a housing function of a plurality of battery submodules.

According to another embodiment of the present disclosure, it is possible to provide a battery pack with enhanced structural stability and improved energy density by coupling unit battery modules according to the present disclosure onto a pack tray in a traverse direction.

The effects of the present disclosure are not limited to the above, and effects not mentioned herein may be clearly understood from the present specification and the accompanying drawings by those skilled in the art.

BEST MODE

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

First, battery modules 100 configuring a battery pack 10 according to the present disclosure will be described in detail.

Figure 1:
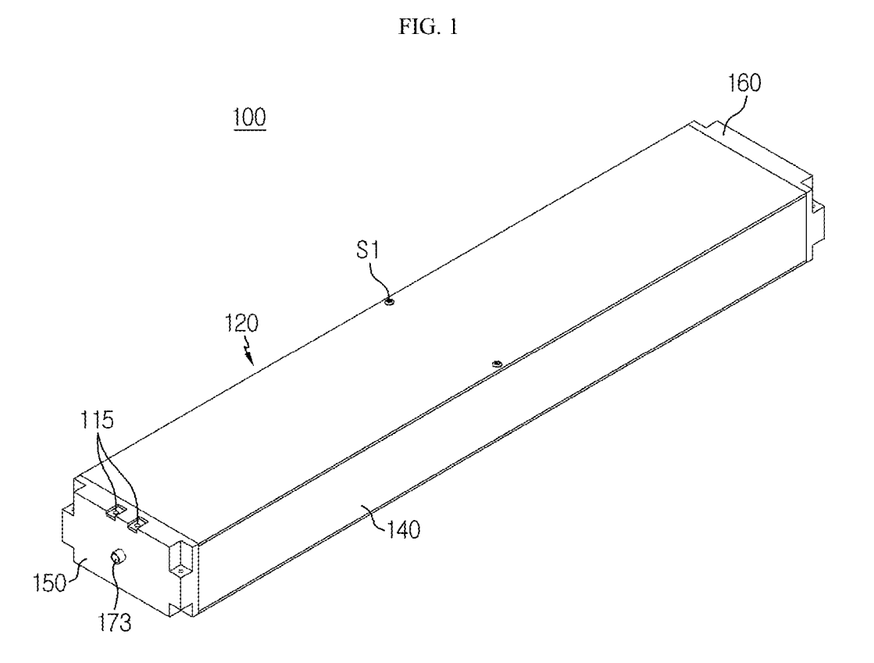
FIG. 1 is a perspective view showing a battery module according to an embodiment of the present disclosure.
Figure 2:
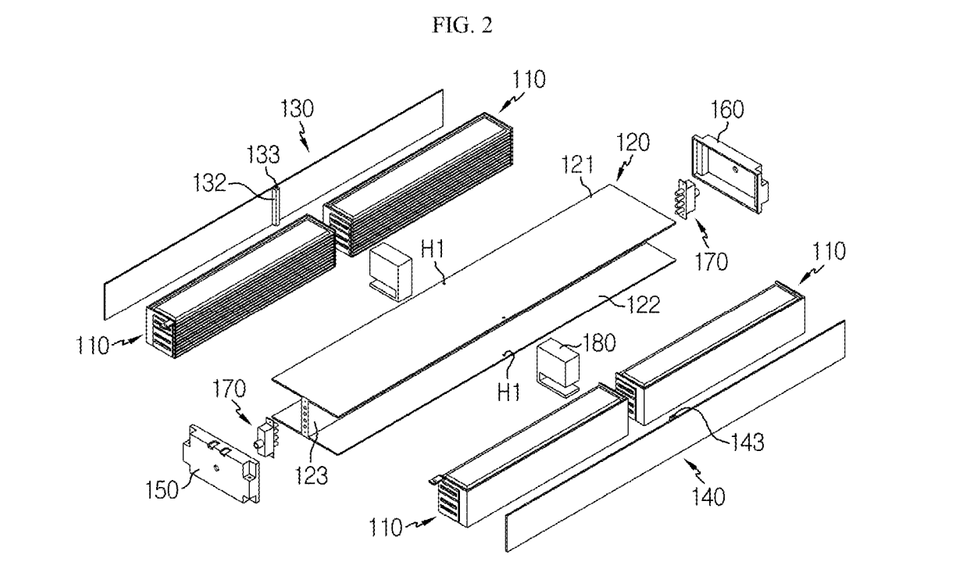
FIG. 2 is an exploded perspective view showing the battery module of FIG. 1.

FIG. 1 is a perspective view showing a battery module according to an embodiment of the present disclosure, and FIG. 2 is an exploded perspective view showing the battery module of FIG. 1.

Referring to FIGS. 1 and 2, the battery module 100 according to the present disclosure may include two or more battery submodules 110, a module frame 120, left and right side plates 130, 140 and front and rear covers 150, 160.

Figure 3:
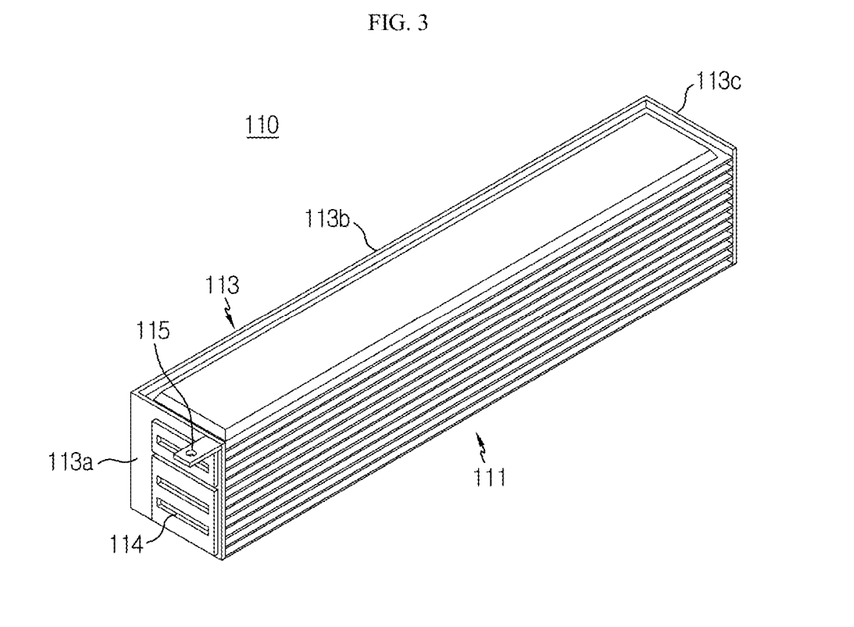
FIG. 3 is a perspective view showing the battery submodule of FIG. 2.

The battery submodule 110 may include a cell stack 111 and an end plate 113.

The cell stack 111 may be an aggregate of battery cells stacked in one direction. Here, the battery cell may be a pouch-type secondary battery. The pouch-type secondary battery may include an electrode assembly, a pouch-shaped battery case accommodating the electrode assembly, and an electrode lead having one side connected to the electrode assembly and the other side extending out of the battery case.

The pouch-type secondary batteries may be electrically connected in series or in parallel to each other by ultrasonic welding the electrode leads to a bus bar 114 formed, for example, in the form of a copper rod.

An electrode terminal 115 may be provided at a front surface and/or a rear surface of the cell stack 111 to be electrically connected to any one of the electrode leads connected in series or in parallel, and the electrode terminal 115 may be exposed to the outside through front and rear covers 150, 160, explained later, or may be connected to an electrode terminal 115 of another battery submodule 110.

For reference, although not shown in the figures, a stacking frame may be used as a means for stacking the pouch-type secondary batteries. The stacking frames hold the pouch-type secondary batteries to prevent the pouch-type secondary batteries from moving and are configured to be stacked on one another to guide the assembling of the secondary batteries. The stacking frame may be also called using various other terms such as a cell cover or a cartridge.

The end plate 113 may have a plate-like structure for protecting the cell stack 111 and guiding to stack the pouch-type battery cells. An end plate 113 according to the conventional art is often fabricated as a structure with a tube or box form that covers four or more surfaces of the cell stack 111. However, as shown in FIG. 3, the end plate 113 of the present disclosure may be formed to have three surfaces 113a, 113b, 113c surrounding front and rear surfaces and one side surface of the cell stack 111.

For example, the cell stack 111 configured with the pouch-type secondary batteries has approximately a rectangular parallelepiped shape, and in the present disclosure, three surfaces of the end plate 113 may be covered by the end plate 113 and three remaining surfaces may be covered by the module frame 120. That is, in the battery submodule 110, the upper and lower surfaces of the cell stack 111, which are not covered by the end plate 113, may be covered by top and bottom plates 121, 122 of the module frame 120, and the remaining side surface may be covered by a barrier 123.

According to this configuration, since the cell stacks 111 of the battery submodules 110 are integrally covered by three surfaces of the end plate 113 and the module frame 120, the battery submodules 110 may be compactly arranged inside the module frame 120, thereby reducing the component cost.

The module frame 120 is a main structure of the housing, which forms the appearance of the battery module 100, and if the battery module 100 is mounted to a pack tray 200 of the battery pack 10, the module frame 120 also serves as the conventional cross beam to prevent the pack tray 200 from being deformed.

Figure 4:
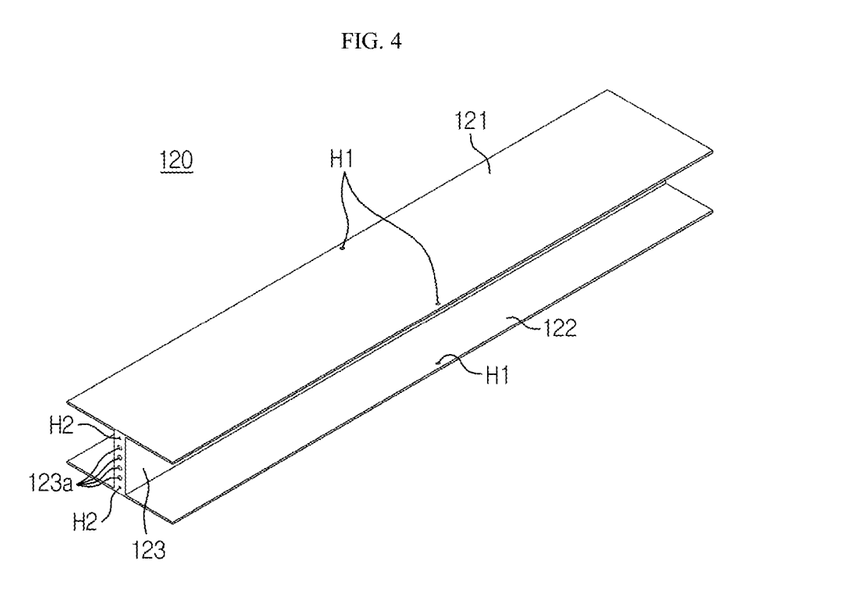
FIG. 4 is a perspective view showing the module frame of FIG. 2.

The module frame 120 may include top and bottom plates 121, 122 arranged to face each other and vertically spaced from each other at a predetermined interval, and at least one barrier 123 having top and bottom ends respectively connected to the lower surface of the top plate 121 and the upper surface of the bottom plate vertically. The top and bottom plates 121, 122 and the barrier 123 of the module frame 120 are elements conceptually distinct from each other and may be molded integrally.

More specifically, as shown in FIGS. 2 and 4, the module frame 120 according to this embodiment may have an H-beam form in which one barrier 123 is vertically connected between the top and bottom plates 121, 122. In the module frame 120, two unit battery submodules 110 may be respectively arranged at a left side and a right side of the barrier 123 in a matrix form.

For example, in this embodiment, the top and bottom plates 121, 122 are provided to have at least a lateral width corresponding to two times the width of the unit battery submodule 110 and at least a length corresponding to two times the length of the unit battery submodule 110, and the barrier 123 vertically bisects the space between the top and bottom plates 121, 122. The unit battery submodules 110 are arranged in two rows and two columns in the bisected space inside the module frame 120 as described above. At this time, the unit battery submodules 110 arranged in the first row are disposed such that the right surfaces thereof face the barrier 123, and the unit battery submodules 110 arranged in the second row are disposed such that the left surfaces thereof face the barrier 123. Here, the side surface of the unit battery submodule 110 facing the barrier 123 means the side surface not covered by three surfaces of the end plate 113, as described above.

Meanwhile, in this embodiment, the module frame 120 is implemented in an H-beam form. However, for example, the module frame 120 may also be configured so that the lateral width of the top and bottom plates 121, 122 are at least three times the width of the unit battery submodule 110 and the space between the top and bottom plates 121, 122 is divided into three parts. In this case, the unit battery submodules 110 may be arranged in the module frame 120 in three rows and two columns.

The left and right side plates 130, 140 are plate-shaped structures that are mounted to the left and right surfaces of the module frame 120 to cover both side surfaces of the module frame 120 and the outer side surfaces of the battery submodules 110. The left and right side plates 130, 140 may be assembled with the module frame 120 to serve as a housing of the battery module 100.

Referring to FIGS. 1 and 2 again, the top and bottom plates 121, 122 have coupling holes H1 formed through edge regions thereof in the vertical direction, and the left and right side plates 130, 140 have protrusions 132 protruding from the surfaces thereof. Also, the protrusions 132 may have coupling grooves 133, 143 that are aligned with the coupling holes H1 in the vertical direction and have threads formed at inner sides thereof.

According to this configuration, the left and right side plates 130, 140 may be vertically erected, respectively, and be put between the top plate 121 and the bottom plate 122 so that the coupling grooves 133, 143 are vertically aligned with the coupling holes H1, and then screws S1 may be put into and fastened to the coupling groove 133, 134 and the coupling holes H1 so that the left and right side plates 130, 140 are coupled to the top and bottom plates 121, 122.

For reference, the battery submodules 110 located in the same row inside the module frame 120 may be arranged with a slight spacing in the front and rear direction. For example, since an electrical connection is also required between the battery submodules 110, the battery submodules located in the same row may be disposed to be spaced apart from each other by a predetermined interval for the electric connection. Thus, the protrusions 132 of the left and right side plates 130, 140 may be interposed in the space between the battery submodules 110 located in the same row.

In addition, a partition block 180 may be further interposed in the spacing between the battery submodules 110. In other words, the partition block 180 may be interposed between the columns of two or more battery submodules 110 located in the same row, and the partition block 180 partitions the battery submodules 110 along with the barrier 123. By means of the partition block 180, the battery submodules 110 in the same row may be separated in the front and rear direction and be prevented from moving. In addition, the partition block 180 may be configured to allow a cable for electric connection or a bus bar for power connection (not shown) between the battery submodules 110 to pass therethrough.

The front and rear covers 150, 160 are structures with a cover form that are mounted to the front and rear surfaces of the module frame 120 to cover the front and rear surfaces of the module frame 120 and the front and rear surfaces of the battery submodules 110. The front and rear covers 150, 160 may be mounted to the front and rear surfaces of the module frame 120 to which the left and right side plates 130, 140 are coupled.

The front and rear covers 150, 160 are provided to prevent the bus bars 114 of the battery submodules 110 from being exposed to the outside, thereby eliminating an external short circuit, and to allow only the electrode terminal 115 for electrical connection with other battery modules 100 to be exposed to the outside.

Meanwhile, the battery module 100 according to the present disclosure may further include a module/tray connection member 170 that has one side connected to at least one barrier 123 of the module frame 120 and the other side exposed to the outside through the front and rear covers 150, 160.

Figure 5:
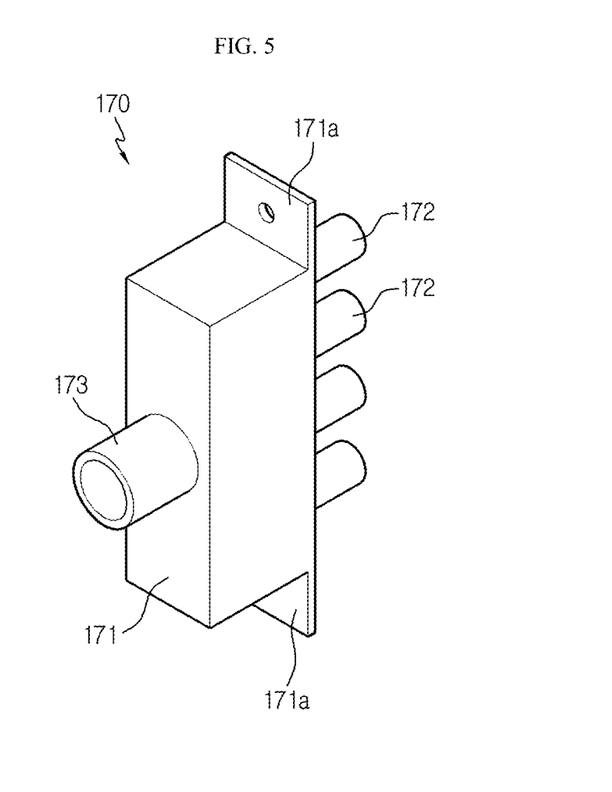
FIG. 5 is a perspective view showing the module/tray connection member of FIG. 2.

The module/tray connection member 170 is a component for fixing the battery module 100 to the pack tray 200, explained later, and more particularly a medium for connecting the module frame 120 of the battery module 100 to a wall of the pack tray 200.

Referring to FIGS. 1 to 2 and 4 to 5, the module/tray connection member 170 may include a body 171 having a predetermined thickness, a flange portion 171*a* extending in the vertical direction from the body 171, a plurality of first connection rods 172 protruding from the body 171 in multi stages, and a second connection rod 173 protruding from the body 171 in a direction opposite to the first connection rods 172.

The plurality of first connection rods 172 may be fitted into accommodation holes 123*a* formed at the front and rear ends of the barrier 123 by tapping, and the flange portions 171*a* may be screwed to screwing grooves H2 formed at the front and rear ends of the barrier 123. In addition, the second connection rod 173 may be configured to be exposed to the outside through the front and rear covers 150, 160. The portion of the second connection rod 173 exposed out of the front and rear covers may be used to fix the battery module 100 to the pack tray 200, explained later.

According to the battery module 100 as described above, since the module frame 120 serves as a housing of the battery module 100 along with the left and right side plates 130, 140 and the front and rear covers 150, 160, the mechanical rigidity of the battery module 100 is increased greatly, and thus it is possible to safely protect the battery submodules 110 from external impacts.

Figure 6:
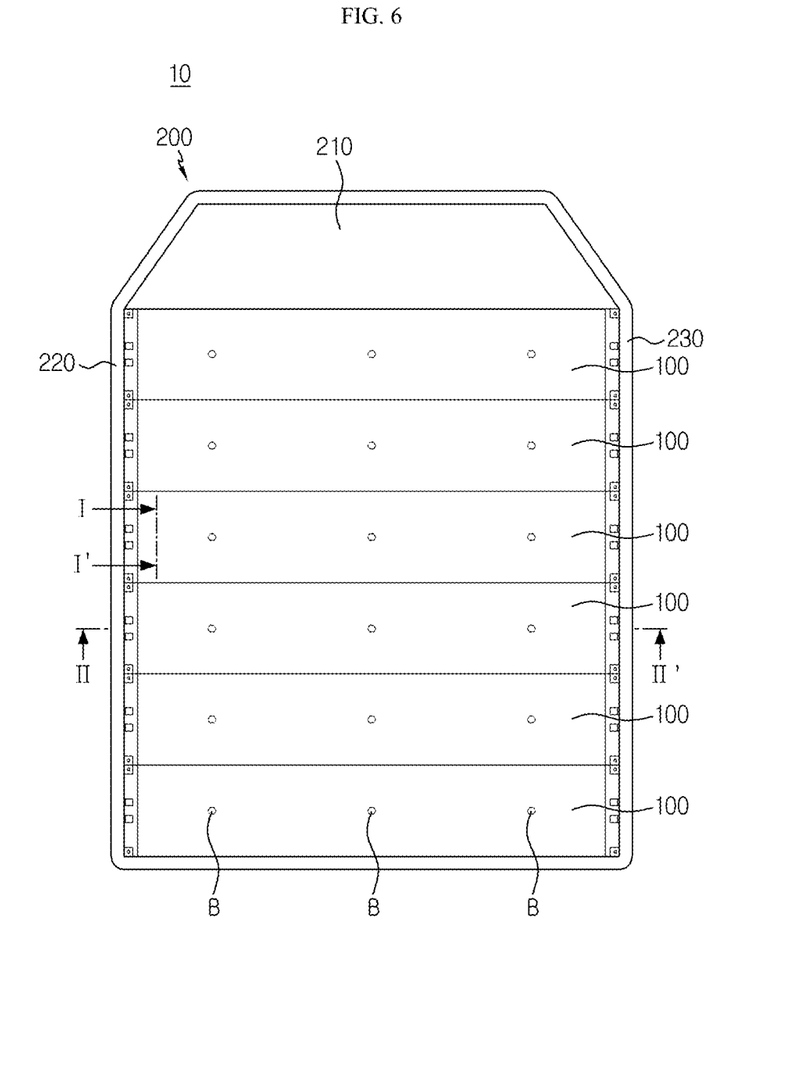
FIG. 6 is a perspective view showing a battery pack according to an embodiment of the present disclosure.

In addition, when the battery pack 10 is configured using the battery modules 100, left and right walls 220, 230 of the pack tray 200 may be supported by the module frame 120 to prevent the battery pack 10 from being deformed due to external impact.

Hereinafter, the battery pack 10 including the battery modules 100 according to the present disclosure will be described in detail.

Figure 7:
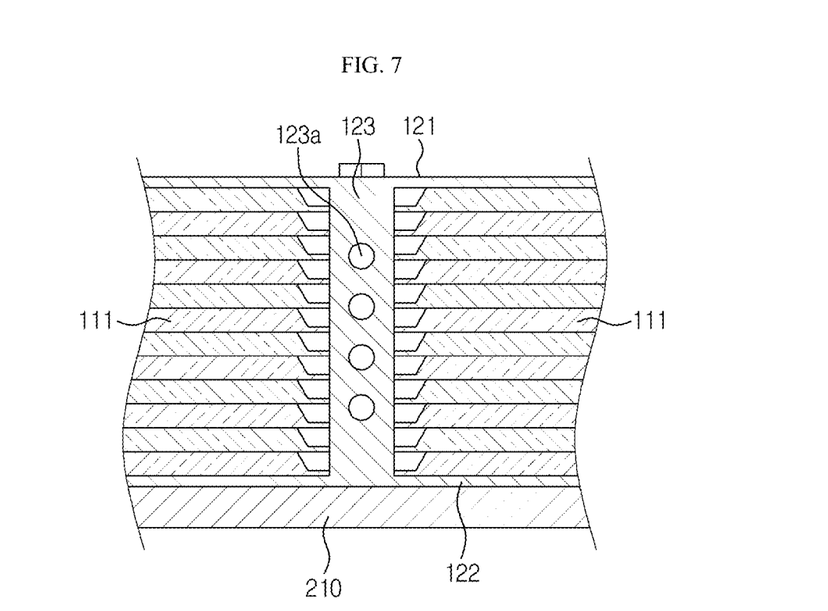
FIG. 7 is a cross-sectioned view, taken along the line I-I' of FIG. 6.
Figure 8:
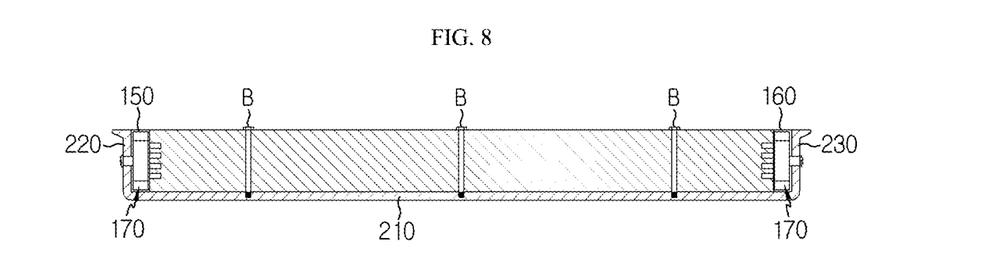
FIG. 8 is a cross-sectioned view, taken along the line II-II' of FIG. 6.

FIG. 6 is a perspective view showing a battery pack according to an embodiment of the present disclosure, FIG. 7 is a cross-sectioned view, taken along the line I-I' of FIG. 6, and FIG. 8 is a cross-sectioned view, taken along the line II-II' of FIG. 6.

The battery pack 10 according to the present disclosure may include the battery modules 100, described above, and the pack tray 200.

Referring to FIG. 6, the pack tray 200 includes a plate surface 210 having a lateral width corresponding to the length of the battery modules 100 and a wall having a predetermined height along a rim of the plate surface 210.

The battery modules 100 are disposed in a traverse direction at the plate surface 210 of the pack tray 200 to support the left and right walls 220, 230 of the pack tray 200. At this time, since there is no structure such as a conventional cross beam on the plate surface 210 of the pack tray 200, the battery modules 100 may be arranged more densely than the conventional one. That is, the battery pack 10 according to the present disclosure allows all the battery modules 100 to be placed in contact with each other without a gap.

For example, in this embodiment, six battery modules 100 are mounted along the longitudinal direction of the pack tray 200. In this case, 24 battery submodules 110 may be mounted in total.

As shown in FIG. 7, the battery modules 100 include the barriers 123 therein, respectively. Thus, when six battery modules 100 are mounted to the pack tray 200, six barriers 123 in total are arranged at regular intervals along the longitudinal direction of the pack tray 200 to give the same function as the cross beam of the conventional pack tray 200. In other words, the barriers 123 play a role of preventing deformation such as bending or twisting of the pack tray 200 by absorbing the impact applied to the battery pack 10.

Figure 9:
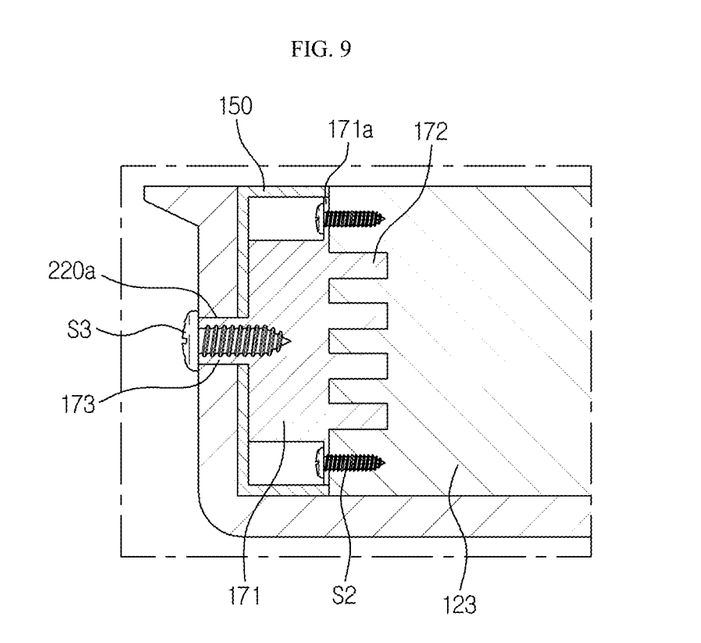
FIG. 9 is an enlarged view showing main parts of FIG. 8.

Subsequently, referring to FIGS. 8 and 9 together with FIG. 6, a coupling structure between the battery module 100 and the pack tray 200 according to an embodiment of the present disclosure will be described.

The left and right walls 220, 230 of the pack tray 200 may have a plurality of perforation holes 220*a* at regular intervals along the longitudinal direction. The perforation holes 220*a* may be provided at a height corresponding to the second connection rod 173 when the battery modules 100 are mounted to the pack tray 200. In addition, the left and right walls 220, 230 of the pack tray 200 may be made of a material with a little elasticity.

Thus, when the battery modules 100 are mounted to the plate surface 210 of the pack tray 200, the left and right walls 220, 230 of the pack tray 200 may be slightly pulled to secure a space, and the second connection rod 173 may be inserted into the perforation holes 220*a* of the left and right wall 220, 230 of the pack tray 200. After that, a screw S3 is fastened to the left and right walls 220, 230 of the pack tray 200 to fix the battery module 100 to the pack tray 200. In an alternative embodiment, the second connection rod 173 may be excluded from the module/tray connection member 170 so that to the battery module 100 may be more easily mounted to the pack tray 200. In this case, the screw may be coupled to the body 171 of the module/tray connection member 170 through the left and right walls 220, 230 of the pack tray 200.

In addition, one end of each battery module 100 may pass through the barrier 123 in the vertical direction and be fixedly coupled to the pack tray 200 by a shoulder bolt B, which is coupled to the plate surface 210 of the pack tray 200.

Since the battery modules 100 are mounted to the pack tray 200 in a horizontal or vertical direction, even if an external impact is applied, the battery pack 10 may be prevented from moving on the pack tray 200. Also, since the barrier 123 and the left and right walls 220, 230 of the pack tray 200 are connected by the module/tray connection member 170, the impact applied to the wall may be buffered by the barrier 123.

According to the configuration of the battery pack according to the present disclosure as described above, unlike the conventional battery pack, it is possible to increase the energy density by intensively mounting a plurality of battery modules 100 to a pack tray without a cross beam, and also it is possible to maintain the structural stability of the battery pack 10.

Next, referring to FIG. 10, the configuration of a battery pack 10 according to another disclosure of the present disclosure will be described. The same reference signs as those in the former embodiment denote the same components and will not be described in detail, and only different features from the former embodiment will be described in detail.

The battery pack 10 according to this embodiment may be regarded as additionally including a cooling structure, in addition to the basic structure of the battery pack 10.

Figure 10:
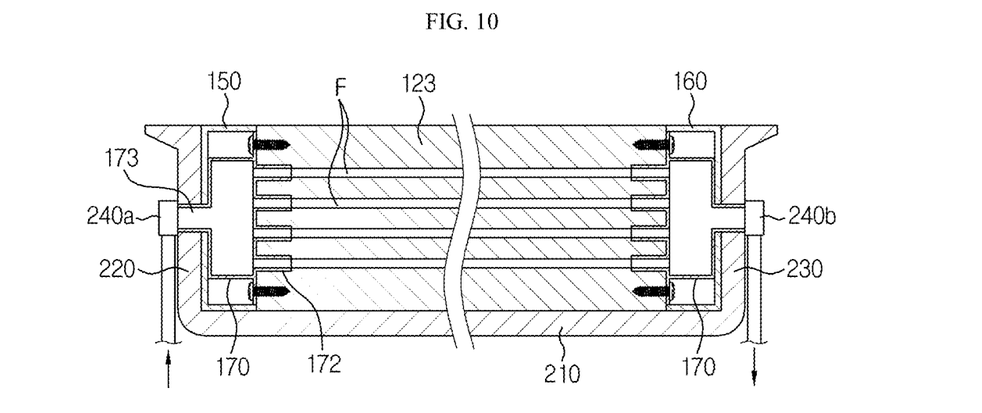
FIG. 10 is a cross-sectioned view showing a battery pack according to another embodiment of the present disclosure, which corresponds to FIG. 8.

For example, referring to FIGS. 7 and 10 together, since one battery module 100 includes four battery submodules 110 whose one sides are disposed to face the barrier 123, a cooling flow path F is formed inside the barrier 123 so that the barrier 123 functions as a heatsink, thereby absorbing the heat generated at the four battery submodules 110.

The module/tray connection member 170 of this embodiment has a passage serving as a pipe therein so that a cooling water flows into the barrier 123, and the accommodation holes 123a provided at the barrier 123 extend from the front end of the barrier to the rear end thereof to form the flow path F. The flow path F may be connected to one side of the module/tray connection member 170, namely the first connection rod 172. In addition, coolant supplying/discharging hoses 240a, 240b may be connected to the other side of the module/tray connection member 170, namely the second connection rod 173.

The heatsink applied to the conventional battery pack 10 is located at a lower portion of the battery module 100, but the heatsink may cause the height of the battery module 100 to be restricted when the battery pack 10 is designed. However, according to the present disclosure, the barrier 123 functions as a cross beam and a heatsink simultaneously, and thus it is possible to eliminate the installation of a separate heatsink. Thus, the space utilization of the battery pack 10 may be further improved.

Meanwhile, in addition to the two or more battery module 100 and the pack tray 200 described above, the battery pack 10 according to the present disclosure may further include various devices for controlling charge and discharge of the battery modules 100, such as a battery management system (BMS), a current sensor, a fuse, and the like, and a pack cover provided to be mutually connectable with the pack tray 200.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or a shape in which an object is placed.

REFERENCE SIGNS

| | |
|---|---|
| 10: battery pack | 100: battery module |
| 110: battery submodule | 111: cell stack |
| 113: end plate | 114: bus bar |
| 115: electrode terminal | 120: module frame |
| 121: top plate | 122: bottom plate |
| 123: barrier | 130: left plate |
| 140: right plate | 150: front cover |
| 160: rear cover | 170: module/tray connection member |
| 171: body | 171a: flange portion |
| 172: first connection rod | 173: second connection rod |
| 180: partition block | 200: pack tray |

What is claimed is:

1. A battery module, comprising:
a module frame comprising:
a top plate and a bottom plate vertically spaced apart from each other at a predetermined interval and disposed to face each other; and
at least one barrier configured to vertically partition a space between the top and bottom plates;
two or more battery submodules arranged inside the module frame in a matrix form with the at least one barrier being interposed therebetween;
a left side plate and a right side plate respectively configured to cover a left side and a right side of the module frame;
a front cover and a rear cover respectively configured to cover a front side and a rear side of the module frame; and
a module/tray connection member having one side coupled to the at least one barrier and the other side exposed to the outside through the front cover and the rear cover.

2. The battery module according to claim 1, wherein:
the module/tray connection member comprises:
a body with a predetermined thickness;
a plurality of first connection rods protruding on the body in multi stages; and
a second connection rod protruding on the body in a direction opposite to the first connection rods;
the plurality of first connection rods are fit into accommodation holes formed at a front end and a rear end of the barrier by tapping; and
the second connection rod is exposed to the outside through the front cover and the rear cover.

3. The battery module according to claim 2, wherein:
the module/tray connection member further includes a flange portion extending from the body in the vertical direction; and
the flange portion is screwed to the barrier.

4. The battery module according to claim 1, wherein:
the top and bottom plates have coupling holes formed through edge regions thereof in the vertical direction;
the left and right side plates have protrusions protruding from surfaces thereof; and
coupling grooves are provided at the protrusions to be screwed to the coupling holes in the vertical direction.

5. The battery module according to claim 1, further comprising a partition block interposed between rows of the two or more battery submodules inside the module frame to partition the battery submodules along with the at least one barrier.

6. The battery module according to claim 1, wherein:
the module/tray connection member has a passage formed therein to serve as a pipe; and the accommodation holes form a flow path connecting from a front end of the at least one barrier to a rear end thereof.

7. A battery module, comprising:
a module frame comprising:
   a top plate and a bottom plate vertically spaced apart from each other at a predetermined interval and disposed to face each other; and
   at least one barrier configured to vertically partition a space between the top and bottom plates;
two or more battery submodules arranged inside the module frame in a matrix form with the at least one barrier being interposed therebetween;
a left side plate and a right side plate respectively configured to cover a left side and a right side of the module frame; and
a front cover and a rear cover respectively configured to cover a front side and a rear side of the module frame,
wherein each of the battery submodules includes comprises:
   a cell stack having battery cells stacked on one another; and
   an end plate having three surfaces surrounding front and rear surfaces and one side surface of the cell stack, and
wherein the other side surface of the cell stack is disposed to face the at least one barrier of the module frame.

8. A battery pack, comprising:
battery modules defined in claim 1; and
a pack tray having a plate surface formed with a width corresponding to a length of the battery modules,
wherein the battery modules are arranged at the plate surface of the pack tray in a traverse direction to support a left wall and a right wall of the pack tray.

9. The battery pack according to claim 8, wherein the other side of the module/tray connection member is inserted into a perforation hole formed in the left and right walls of the pack tray.

10. The battery pack according to claim 9, wherein:
the module/tray connection member has a passage therein to serve as a pipe;
the at least one barrier has a flow path connected to one side of the module/tray connection member; and
the battery pack further comprises a coolant supplying/discharging hose connected to the other side of the module/tray connection member at an outer side of the perforation hole of the left and right walls of the pack tray.

11. A battery pack, comprising:
a plurality of battery modules, each of the plurality of battery modules comprising:
   a module frame comprising:
      a top plate and a bottom plate vertically spaced apart from each other at a predetermined interval and disposed to face each other; and
      at least one barrier configured to vertically partition a space between the top and bottom plates;
   two or more battery submodules arranged inside the module frame in a matrix form with the at least one barrier being interposed therebetween;
   a left side plate and a right side plate respectively configured to cover a left side and a right side of the module frame;
   a front cover and a rear cover respectively configured to cover a front side and a rear side of the module frame; and
a pack tray having a plate surface formed with a width corresponding to a length of the battery modules,
wherein the battery modules are arranged at the plate surface of the pack tray in a traverse direction to support a left wall and a right wall of the pack tray, and
wherein the battery modules are fixed to the pack tray by means of a shoulder bolt that has one end passing through the at least one barrier in the vertical direction, the shoulder bolt being coupled to the plate surface of the pack tray.

\* \* \* \* \*